(No Model.)

R. A. GALBRAITH.
DEVICE FOR TESTING EGGS.

No. 441,656. Patented Dec. 2, 1890.

Witnesses
N. B. Harris
Wm. F. Brereton

Inventor
Robert A. Galbraith
By Henry Wise Garnett
Attorney

UNITED STATES PATENT OFFICE.

ROBERT A. GALBRAITH, OF WHITE CITY, KANSAS.

DEVICE FOR TESTING EGGS.

SPECIFICATION forming part of Letters Patent No. 441,656, dated December 2, 1890.

Application filed June 17, 1890. Serial No. 355,767. (No model.)

*To all whom it may concern:*

Be it known that I, ROBERT A. GALBRAITH, a citizen of the United States, residing at White City, in the county of Morris and State of Kansas, have invented certain new and useful Improvements in Devices for Testing Eggs; and I do hereby declare the following to be a full, clear, and exact description of the invention, such as will enable others skilled in the art to which it appertains to make and use the same.

My invention relates to improvements in devices for testing eggs; and it consists in certain novel details in construction of the several parts composing the same, as will be hereinafter more specifically described in the specification, and pointed out in the annexed claims.

The object of this invention is to provide a simple, convenient, and effective apparatus whereby the layers of eggs with their accompanying fillers, as they are now usually packed in boxes or crates, may be lifted out thereof and placed over a light, so that the stale eggs may be detected, after which the layer of eggs and filler are returned to similar receptacles, the operation being performed with ease and dispatch and without liability of breakage.

In carrying out my invention I proceed as follows, reference being had to the accompanying drawings, forming a part hereof, where—

Figure 1:
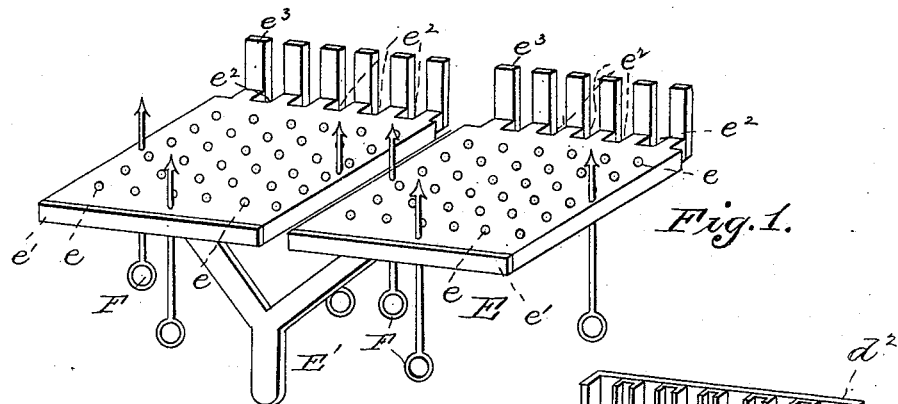
Figure 2:
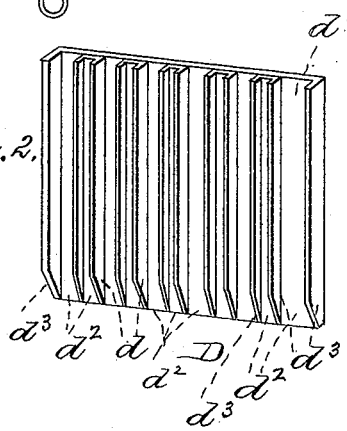
Figure 5:
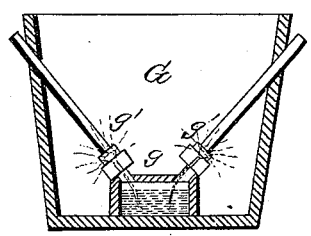
Figure 4:
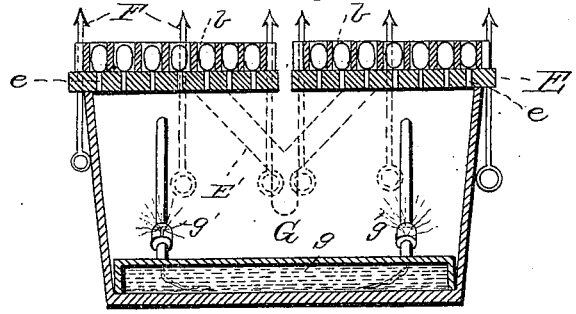
Figure 3:
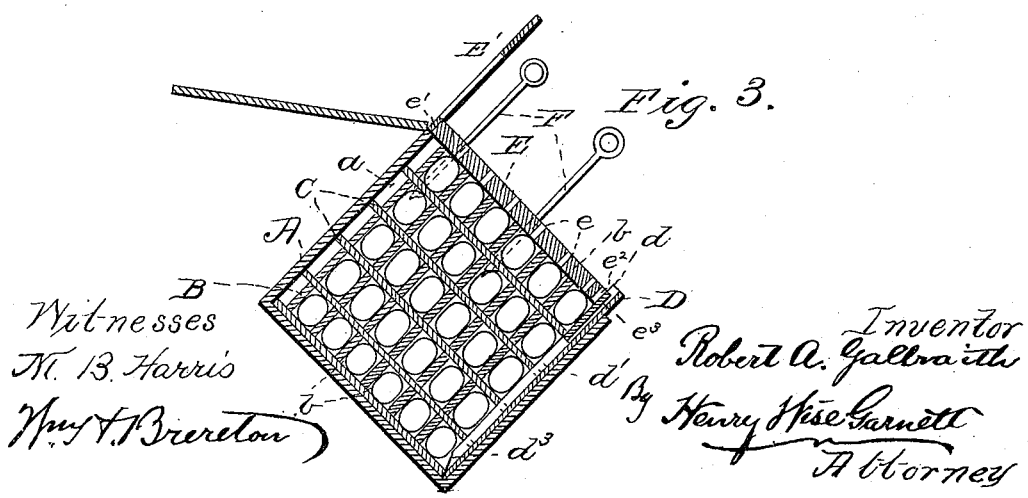

Figure 1 is a view in perspective of the frames for removing the layer of eggs from the crate and supporting the same over the light. Fig. 2 is a similar view of the guide-tray; Fig. 3, a sectional elevation illustrating the parts in position ready for removing a layer of eggs from a crate. Fig. 4 is a similar view illustrating the egg-trays with their layer of eggs in position upon the lamp-box. Fig. 5 is a detail sectional view of the lamp-box.

The letter A designates the usual egg-crate, having two compartments separated by a central partition $a$; B, the fillers, and C the usual card placed between each two layers of eggs to separate the same.

To remove the eggs from the box or crate I proceed as follows, the said crate first having been laid upon its side and tilted slightly backward, as shown in Fig. 3: The guide-trays D are now introduced into the crate, as shown in Fig. 3, so that said trays will extend along the lower side of the layers of eggs between the side wall of the crate and one side of the fillers.

The guide-trays D are preferably of sheet metal, of a size to fit the compartments of the crate, and arranged longitudinally thereof are a series of flanges $d$, that are slightly separated from each other, whereby a series of ways $d'$ and $d^2$ are formed along the face of the tray, for the purposes as will presently appear, and to enable the said trays to be readily introduced past the fillers in the crate the lower ends of the flanges $d$ are beveled, as shown at $d^3$. When the guide-trays are in position in the crate, the ends of the fillers occupy the spaces $d'$, as shown in Fig. 3, and after said trays have been so placed in the crates the frames E are next placed in position.

The frame E is of wood or other suitable material, of a size relatively the same as the dimensions of the compartments of the crate, and it is provided with a series of openings $e$, corresponding to the openings $b$ of the fillers B. To the frame E is secured a bent bar E', that forms a handle whereby the said frame is manipulated, and this handle forms a part of a strap $e'$, that extends along one edge of the frame to strengthen the same. Along the edge of the frame, opposite the strap $e'$, is formed a series of slots $e^2$, into which the flanges $d$ of the guide-tray are received when removing or replacing a layer of eggs, as shown in Fig. 3, and also projecting from said edge of said frame is a series of strips $e^3$, that occupy the ways $d^2$ of the guide-trays D and also form the rest or stop for the lower edge of the layer of eggs and their filler. Through the frame E, at the top and sides of the same, project arrow-headed pins F, for the purpose as will presently appear.

To use the frames E the pins F are first drawn outward. Then the frame is lifted by the handle E' and the strips $e^3$ are placed in the ways $d^2$ of the guide-trays, so that said trays rest flush up against the fillers in the crate, as shown in Fig. 3. The pins F are now pushed forward, so that their arrow-heads will perforate the card C at the back of the filler, whereby said card is held in place against the back of the filler, thus holding the eggs therein. After the pins F have been driven through the card the frame E is drawn outward and gradually inclined downward, which will bring the eggs over the openings in said frames. The frame may now be turned bottom side up and the card C removed. Then the frame is placed over the lamp upon the lamp-box G, as shown in Fig. 4, the light from the lamps $g$ of which being reflected through the eggs, a glance will detect any cloudy or dark eggs, which are the unsound ones, after which the card is again placed upon the filler and the frame removed from the lamp-box and placed in an empty crate, into which crate two of the guide-trays D had previously been placed, the object of which trays is to guide and hold the frame E in place while removing and replacing the layers of eggs. The projecting strips $e^3$, in connection with the pins F, prevent any lateral displacement of the egg-fillers, so that accidental slipping off of the said egg-fillers from the frame is prevented, so that dropping of the eggs cannot occur.

Turning now to the lamp-box G, such is made of suitable dimensions to receive the frame E upon the top thereof, which is open, while the four sides and bottom are closed, and at the bottom, which is somewhat narrower than the top, is arranged a lamp $g$. The burners $g'$, preferably four in number, are arranged at an angle, so that their chimneys will project through the sides of the box near its top edge. The heat generated by the lamps will not, therefore, be directed upon the eggs, but will be conveyed outside of the box.

It will be noted that at each operation two layers of eggs with their accompanying "fillers," as they are called, each filler holding three dozen eggs, are handled at a time. The operation of examining a crate of eggs will therefore occupy but a very short space of time and without risk or labor.

Having thus fully described my invention, what I claim as new therein, and desire to secure by Letters Patent of the United States, is—

1. The frame E, having openings $e$ and handle E' and provided with the arrow-headed pin F, substantially as and for the purposes described.

2. The guide-tray having ways, jointly with a perforated frame having a handle and arrow-headed pins, substantially as and for the purposes described.

3. In combination with the frame E, having openings $e$, handle E', strips $e^3$, and slots $e^2$, the tray D, having bevel end $d^3$, ways $d^2$, and flanges $d$, substantially as and for the purposes described.

ROBERT A. GALBRAITH.

Witnesses:
JOHN TAGGART,
D. W. McKEY.